United States Patent [19]

Lowe et al.

[11] Patent Number: 4,601,455

[45] Date of Patent: Jul. 22, 1986

[54] COMBINATION MEMORY AND SAFETY STOPS FOR SEATS

[75] Inventors: Steven P. Lowe, Box 649, Weatherfored, Okla. 73096; Joseph H. Stuever, Oklahoma City, Okla.

[73] Assignee: Steven P. Lowe, Sr., Weatherford, Okla.

[21] Appl. No.: 643,876

[22] Filed: Aug. 24, 1984

[51] Int. Cl.⁴ .............................................. B60N 1/08
[52] U.S. Cl. .................................................... 248/429
[58] Field of Search .............. 248/429, 430, 419, 420, 248/424, 393; 397/317, 324, 341; 308/3 R, 3.6, 3.8

[56] References Cited

U.S. PATENT DOCUMENTS

| | | |
|---|---|---|
| 1,899,585 | 10/1931 | Nelson et al. . |
| 1,987,431 | 1/1935 | Browne . |
| 2,001,999 | 5/1935 | Bishop . |
| 2,151,419 | 3/1939 | Buchner . |
| 2,285,616 | 6/1942 | Saunders et al. . |
| 2,579,599 | 12/1951 | Moroney . |
| 2,678,681 | 5/1954 | Haltenberger . |
| 3,672,625 | 6/1972 | Cazabon .............................. 248/429 |
| 4,209,159 | 6/1980 | Becker et al. . |

Primary Examiner—Reinaldo P. Machado
Assistant Examiner—Alvin Chin-Shue
Attorney, Agent, or Firm—Dunlap, Codding & Peterson

[57] ABSTRACT

Adjustable safety stops for limiting the fore-and/or-aft movement of a vehicle seat to the extent desired by the user. The assembly includes a locking mechanism extending fore-and-aft adjacent or underneath the seat and adjustable stops on the locking mechanism for engaging abutments on the seat. Each adjustable stop is engaged with and disengaged from the locking means by a cam arrangement by the user.

8 Claims, 5 Drawing Figures

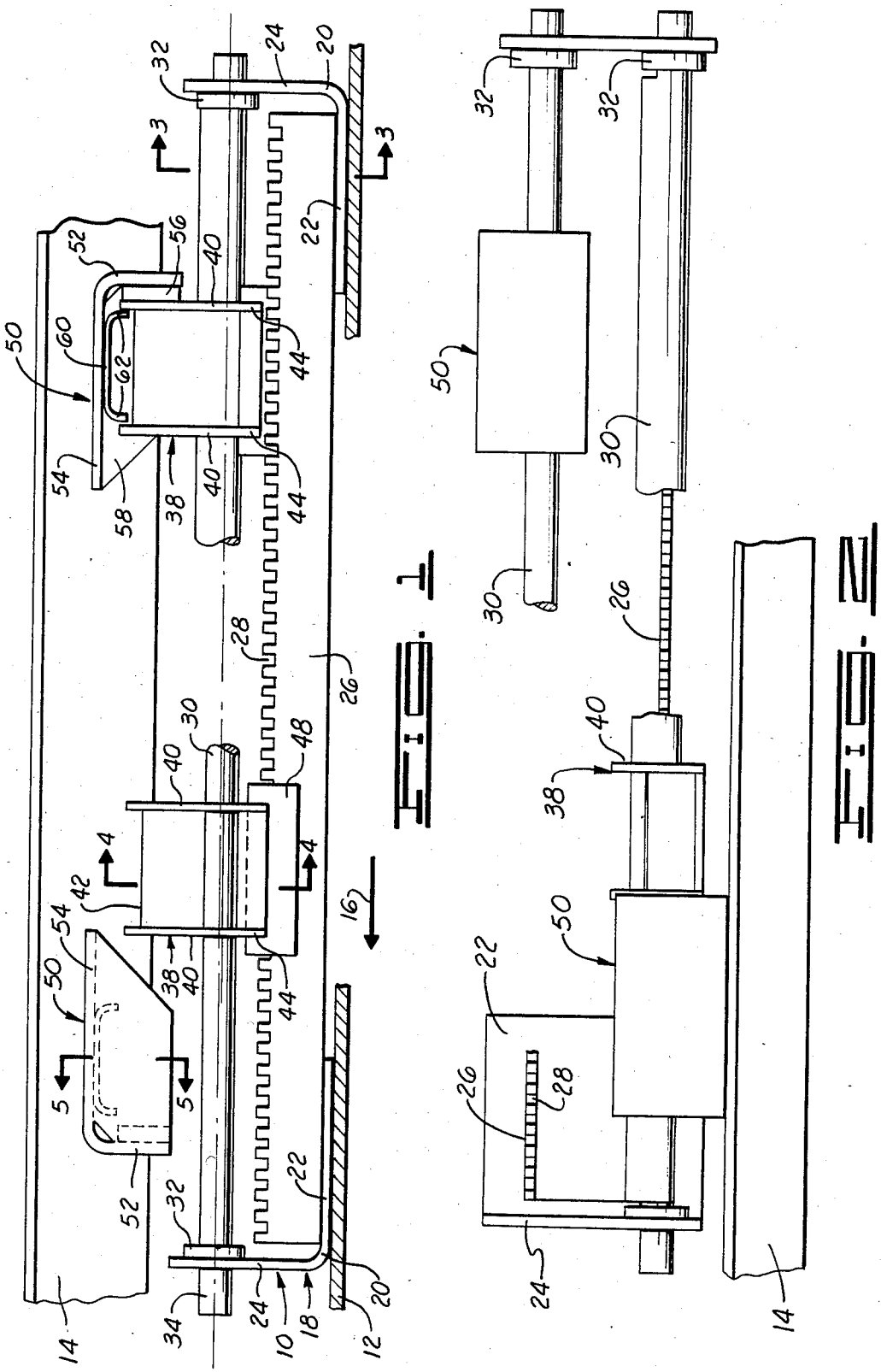

COMBINATION MEMORY AND SAFETY STOPS FOR SEATS

BRIEF SUMMARY OF THE INVENTION

1. Field of the Invention

This invention relates to controls for movable seats, and more particularly, but not by way of limitation, to combination memory and safety stops for limiting the forward and/or reverse movement of adjustable seats.

2. Background of the Invention

It is well known in the art to provide seats in motor vehicles and aircraft where the seats are manually adjustable fore-and-aft to suit the convenience of the occupant of the seat and to permit fore-and-aft movement of the seat to gain access to a vehicle through adjacent doors. A common technique is to mount a seat on rails and provide a mechanical lock which can be operated by the occupant or others to lock the seat in the desired fore-and-aft position. Although some seat structures have fixed stops to limit the extent of the fore-and-aft movement, the positions of the fixed stops are such that the seat either cannot be moved the desired distance, or the seat can be moved an excessive distance. This latter situation is particularly disturbing in aircraft where the pilot's seat is capable of moving so far rearward in the event of failure of the locking mechanism that the pilot cannot reach the controls.

In accordance with the present invention, readily adjustable stops are provided to limit either the fore or aft sliding movement of the seat, or both, to meet the convenience of the user. The present invention is applicable to both motor vehicles and aircraft. Thus, the term "vehicle" as used in this specification is intended to encompass both motor vehicles and aircraft.

BRIEF DESCRIPTION OF THE DRAWINGS

FIG. 1 is a side view of the safety stop arrangement of the present invention, with only a portion of a seat being shown to illustrate relationship of the adjustable stops to the seat.

FIG. 2 is a plan view of the structure shown in FIG. 1.

DETAILED DESCRIPTION OF THE DRAWINGS

Figure 3:
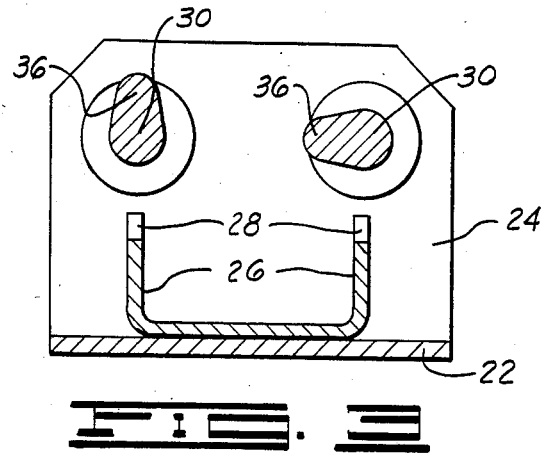
FIG. 3 is a cross sectional view taken along lines 3—3 of FIG. 1.

Referring to the drawings in detail, reference character 10 generally designates the adjustable stop arrangement of the present invention which is positioned between the floor 12 of a vehicle and a seat 14 partially illustrated in FIGS. 1 and 2. For purposes of orientation, the arrow 16 in FIG. 1 is to indicate the forward direction of the seat 14.

Figure 4:
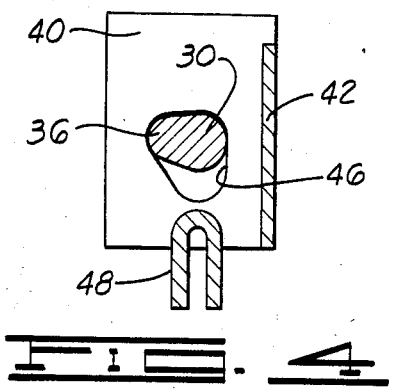
FIG. 4 is a cross sectional view taken along lines 4—4 of FIG. 1.
Figure 5:
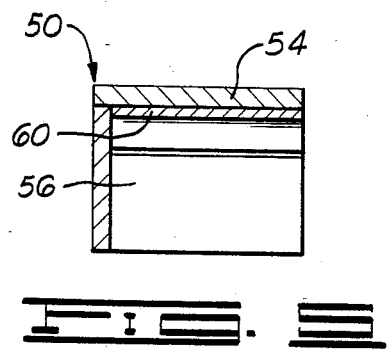
FIG. 5 is a cross sectional view taken along lines 5—5 of FIG. 1.

The stop arrangement 10 includes a locking mechanism generally designated by reference character 18. The locking mechanism 18 comprises a pair of fore-and-aft L-shaped brackets 20, each of which has a horizontally extending leg 22 suitably attached to the floor 12 of the vehicle and a vertically extending portion 24. A pair of parallel bars 26 are suitably secured at their opposite ends to the horizontally extending portions 22 of the brackets 20. Each bar 26 has a series of notches 28 in the upper surface thereof, preferably arranged over substantially the entire length of the respective bar. The locking mechanism 18 also includes a pair of rods 30 journaled in the vertically extending legs 24 of the brackets 20 by means of suitable bearings 32. The forward end portion 34 of each rod 30 projects forwardly of the front bracket leg 24 and preferably has a knob or handle (not shown) thereon for the manual turning of the rods 30 as will be more fully set forth below. As shown in FIGS. 3 and 4, each rod 30 has a cam 36 protruding from one side thereof over substantially the entire length of the respective rod between the bearings 32.

An adjustable stop generally designated by reference character 38 is mounted on each of the rods 30. Each adjustable stop 38 comprises a pair of fore-and-aft vertically extending plates 40 secured together at one side by a plate 42. The lower end portions 44 of the plates 40 are positioned to extend into a pair of the notches 28 in the respective bar 26 when the respective stop is lowered as illustrated by the left-hand stop 38 in FIG. 1. Each rod 30 extends through an aperture 46 of the front and rear plates 40 of the respective stop 38. Each aperture 46 is non-circular, as illustrated in FIG. 4, such that when the respective rod 30 is turned a partial turn in one direction the respective stop 38 will be raised a sufficient distance that the lower ends 44 of the respective plates 40 will be disengaged from the notches 28 as illustrated by the position of the right hand stop 38 in FIG. 1. On the other hand, when the respective rod 30 is turned in the opposite direction, the respective stop 38 will move by gravity downwardly for the lower ends 44 of the plates 40 to engage a pair of the notches 28, depending upon the fore-and-aft location of the respective stop. As shown most clearly in FIG. 4, a guide 48 is secured to the lower end portion of each stop 38. Each guide 48 is in the form of an inverted U-shape and the side legs thereof are in sliding engagement with the opposite sides of the respective bar 26 in order to maintain the respective stop 38 in vertical alignment with the bar as the stop is moved fore-and-aft, as well as to maintain the respective stop 38 in its intended operating position as illustrated in FIG. 1.

A pair of abutments 50 are suitably secured to the seat 14 for engaging the stops 38 and limiting the fore-and-aft movement of the seat. Each abutment 50 includes an L-shaped plate having a vertical leg 52 and a horizontally extending leg 54, with the horizontal legs 54 extending generally toward one another. The vertical leg 52 of one of the abutments 50 is positioned to be in alignment with the rearmost plate 40 of the rearmost stop 38, and the vertical leg 52 of the foremost abutment 50 is arranged to be generally in alignment with the foremost vertical plate 40 of the forward stop 38. Each vertical leg 52 of each abutment is provided with an elastomeric pad 56 to engage the respective stop 38 and cushion the stopping movement of the seat 14 when the seat is moved to the desired fore-and-aft limits. The legs 52 and 54 of each abutment 50 are preferably connected by a vertically extending plate 58 which forms a brace for strengthening purposes. A C-shaped plate 60 is secured to the underside of each horizontal leg 54 of each abutment 50 with the ends 62 thereof extending downwardly. These ends 62 are arranged to fit between the fore-and-aft vertical plates 40 of the respective stop 38 when the respective abutment 50 is in a predetermined relationship with respect to the stop and the respective stop is raised as illustrated by the position of the rearmost stop 38 in FIG. 1.

As will be apparent from the foregoing and the drawings, the rearmost stop 38 shown in FIG. 1 is utilized to limit the forward movement of the seat 14 and the forward stop 38 is for the purpose of limiting the rearward movement of the seat 14. In order for the rearmost stop 38 to be placed in the desired location, the seat 14 is moved forwardly until the rearmost abutment 50 is located over the upper end of the rearmost stop 38 as illustrated in FIG. 1. The respective rod 30 is then turned to raise the respective stop 38 to the position shown in FIG. 1 such that the legs 62 of the C-shaped member 60 extend between the vertical plates 40 of the respective stop 38. At the same time, the lower ends 44 of the respective stop 38 are disengaged from the notches 28 of the respective bar 26. Whereupon, the seat 14 is moved as far forward as the occupant wishes the seat to move. The rod 30 associated with the rearmost stop 38 is then turned in the opposite direction to position the lower ends 44 of the end plates of the respective stop into mating notches 28 and also to lower the upper ends of the respective vertical plates 40 below the legs 62 of the abutment. The seat 14 is then free to move rearwardly without dislodging the rearmost stop 38, yet the rearmost stop 38 will be in the path of movement of the abutment 50 when the seat 14 is again moved forwardly to limit such forward movement. The forward stop 38 is similarly positioned with respect to the forward abutment 50 to limit the rearward movement of the seat 14 to the extent desired by the occupant. For example, the foremost stop 38, when the assembly is used in an aircraft, would be located in such a position that the seat 14 would be limited in its rearward movement to the extent that a pilot could still reach the controls and maintain control of the craft.

Changes may be made in the combination and arrangement of parts or elements as heretofore set forth in the specification and as shown in the drawings without departing from the spirit and scope of the invention as defined by the following claims.

What is claimed is:

1. In combination with a seat adjustably mounted on the floor of a vehicle for fore-and-aft movement:
   abutment means secured to the seat;
   locking means secured to the floor of the vehicle extending fore-and-aft with respect to the seat including a bar extending fore-and-aft and having a series of notches in the upper surface thereof along the length of the bar;
   first stop means adjustably mounted on the locking means for positioning at selected fore-and-aft locations on the locking means in the path of movement of the abutment means when the seat is moved, the first stop means including at least one plate sized to be inserted in selected notches of said bar; and wherein the first stop means comprises a pair of fore-and-aft end plates connected by a side plate, said end plates being arranged to be inserted in selected pairs of said notches.

2. The combination of claim 1 wherein the abutment means includes an elastomeric pad positioned to engage one of the end plates of the first stop means when movement of the seat is stopped by the first stop means.

3. The combination of claim 1 wherein the end plates of the first stop means have mating apertures therein aligned fore-and-aft; and wherein
   the locking means includes a rod extending fore-and-aft through said apertures, along which the first stop means may slide when the end plates are not in engagement with the notches in the bar.

4. The combination of claim 3 wherein the rod has a cam extending along the length thereof, and said apertures are non-circular, whereby the first stop means may be raised and lowered by turning the rod.

5. The combination of claim 4 wherein the first stop means has a depending guide slidingly engaging at least one side of the bar to guide the first stop means when it is moved fore-and-aft.

6. The combination of claim 5 wherein said guide is an inverted U-shaped plate having legs extending down on opposite sides of the bar.

7. The combination of claim 4 wherein the abutment means has a pair of depending flanges arranged to engage the end plates of the first stop means when the abutment means is in a predetermined position with respect to the first stop means and the first stop means is raised, whereby the position of the first stop means may be adjusted fore-and-aft by movement of the seat fore-and-aft.

8. The combination of claim 4 characterized further to include:
   a second notched bar;
   a second stop means associated with the second notched bar; and wherein
   said abutment means are positioned to engage the first stop means to limit the aft movement of the seat and engage the second stop means to limit the fore movement of the seat.

* * * * *